United States Patent
Krebs et al.

(10) Patent No.: US 6,922,654 B2
(45) Date of Patent: Jul. 26, 2005

(54) METHOD FOR SHORTENING THE STATISTICAL MEASUREMENT TIMES IN THE DOMAIN OF RADIOACTIVITY MEASUREMENTS

(75) Inventors: Bodo Krebs, Heidenau (DE); Ingo Kölln, Hamburg (DE)

(73) Assignee: Rados Technology GmbH, Hamburg (DE)

( * ) Notice: Subject to any disclaimer, the term of this patent is extended or adjusted under 35 U.S.C. 154(b) by 0 days.

(21) Appl. No.: 10/398,726
(22) PCT Filed: Oct. 4, 2001
(86) PCT No.: PCT/EP01/11494

§ 371 (c)(1),
(2), (4) Date: Aug. 11, 2003

(87) PCT Pub. No.: WO02/31534

PCT Pub. Date: Apr. 18, 2002

(65) Prior Publication Data

US 2004/0030506 A1 Feb. 12, 2004

(51) Int. Cl.[7] ............................................. G06F 101/14
(52) U.S. Cl. ....................................... 702/179; 250/366
(58) Field of Search ................................ 702/8, 28, 49, 702/147, 149, 172, 176, 177, 179, 181, 188, 193; 250/370.09, 369, 574, 374, 459.1; 378/19

(56) References Cited

U.S. PATENT DOCUMENTS

| | | | | |
|---|---|---|---|---|
| 3,670,164 A | * | 6/1972 | Hardy et al. | ................ 250/366 |
| 5,987,483 A | * | 11/1999 | Edelkind et al. | ............ 708/250 |
| 6,360,183 B1 | * | 3/2002 | Shilton | ....................... 702/179 |

FOREIGN PATENT DOCUMENTS

DE        42 40 535        1/1994

* cited by examiner

*Primary Examiner*—Marc S. Hoff
*Assistant Examiner*—Mohamed Charioui
(74) *Attorney, Agent, or Firm*—Vidas, Arrett & Steinkraus, P.A.

(57) ABSTRACT

Method for the detection of an exceeding of a predetermined limiting value in a radioactivity measurement. A total duration of measurement for a contamination measuring device is calculated. Several single measurements are performed with the measuring device, with duration of measurement shorter than the total duration of measurement. After each single measurement, a probability is calculated on the basis of the previously measured measurement values. If the calculated probability is smaller than or equal to the limiting value, a signal is generated and the procedure is ended. Otherwise, further single measurements are performed.

5 Claims, 1 Drawing Sheet

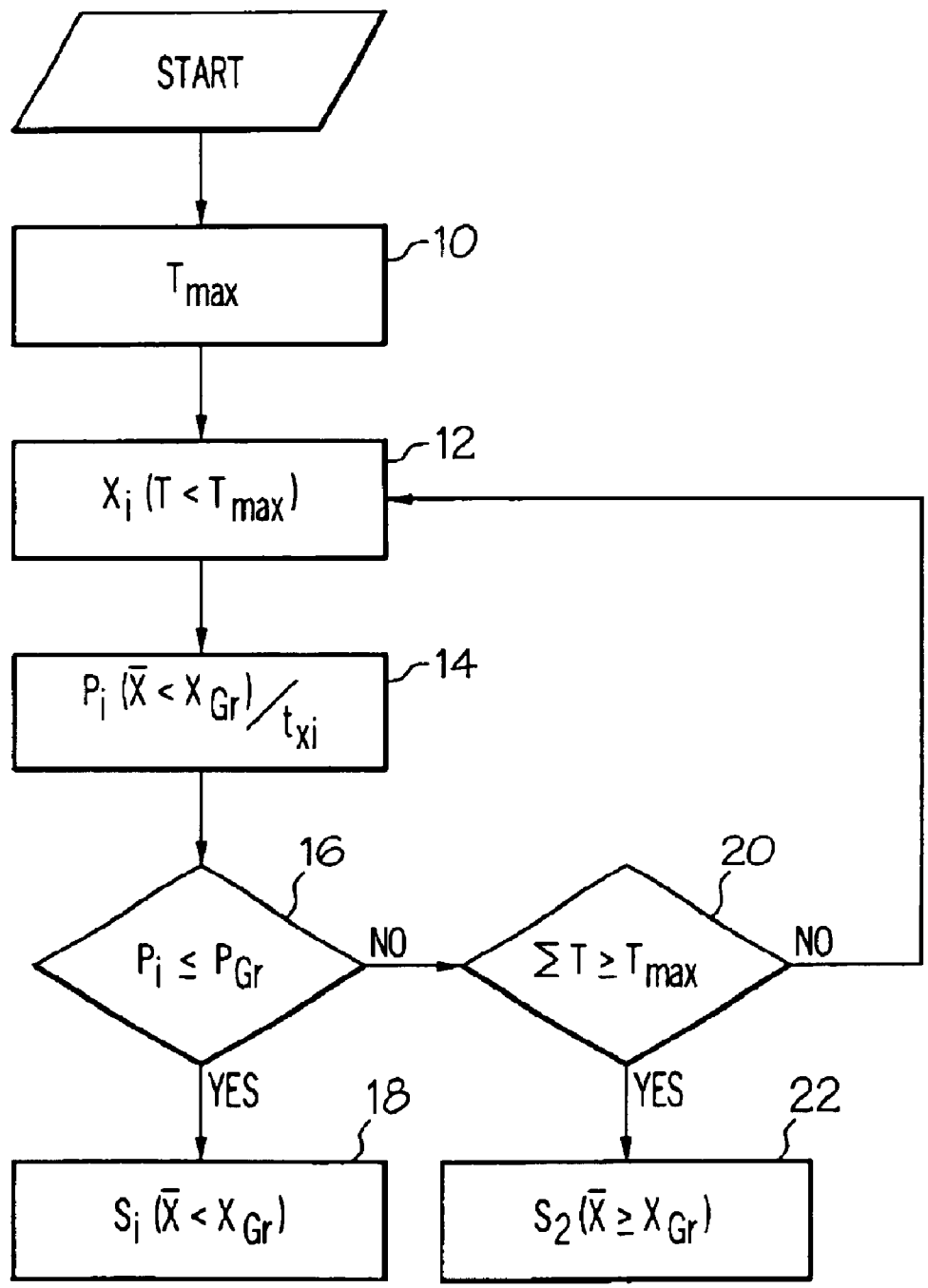

METHOD FOR SHORTENING THE STATISTICAL MEASUREMENT TIMES IN THE DOMAIN OF RADIOACTIVITY MEASUREMENTS

CROSS-REFERENCE TO RELATED APPLICATIONS

Not Applicable

STATEMENT REGARDING FEDERALLY SPONSORED RESEARCH

Not Applicable.

BACKGROUND OF THE INVENTION

The invention is related to a method for the detection of an exceeding of a limiting value in a radioactivity measurement.

In the measurement of radioactive contaminations, the measurement values are compared with a limiting value which results from regulatory and legal prescriptions, respectively. Due to the nature of radioactive radiation, the measurement values are subject to periodical variations. Therefore statistical certainties are used for the measurement of a contamination, which are related to the so-called background measurement and the event measurement. In doing this, it is known to establish the duration of measurement in dependence of the necessary statistical certainty, the resulting limiting value and the value of the background measurement. The duration of measurement for the fulfilment of the statistical certainty is thus predefined already before the beginning of the actual measurement, and is calculated from the aforementioned parameters. The measurement value for the predetermined duration of measurement is determined and compared with the limiting value for the measurement value. If the measurement value is above the limiting value, an exceeding of the limiting value is stated. With the known method, it is disadvantageous that comparatively long durations of measurement result, even when there is no contamination (net measurement rate).

From DE 42 40 535, a method is known for fast detection of a radiation source with a gamma line, moving in relation to the receiver.

From U.S. Pat. No. 3,670,164, a plutonium detector for persons is known. With the plutonium detector, the background radiation is continuously measured by a number of gamma detectors. The measured value is used as the actual value for the background radiation upon the entrance of a person into the detection zone, and accounted for in the measurement.

The invention has the objective to provide a method for the detection of an exceeding of a limiting value, which promptly and reliably indicates the occurrence of an exceeding of a limiting value.

BRIEF SUMMARY OF THE INVENTION

In the inventive method, the exceeding of a limiting value in a radioactivity measurement is detected. In a first step, a maximum duration of measurement is calculated for a contamination measurement device used. Preferably, the duration of measurement for the contamination measuring device is calculated with the aid of the detection limit defined in DIN 25482/1. According to the invention, thereafter several single measurements are performed with the measuring device, each with a shorter duration of measurement. After each single measurement, a probability is calculated on the basis of the previously measured measurement values, that the mean value of all the measurement values exceeds the limiting value in the still remaining duration of measurement. This probability can be calculated without big problems, using the pertinent mathematics of probability calculation. In the case that the calculated probability is smaller or equal to a predetermined certainty, a signal is generated which stops the measurement. The predetermined certainty is formed by a numerical value and serves as a comparative value for the calculated probability. Thus, in this case, a statement with a sufficient reliability has been achieved by one or several single measurement(s) with a shorter duration of measurement than the prescribed total duration of measurement. If the probability that in the still remaining single measurements the mean value of all the measuring values exceeds the limiting value is greater than the predetermined certainty, a single measurement is performed anew and the probability is determined anew taking into account the new measurement value. This procedure is repeated as long as either a signal is generated that no certainty exists, or until the sum of the durations of the single measurements reaches or exceeds the total duration of measurement. In the latter case, the probability for an exceeding of the limiting value is greater than the predetermined certainty, so that, dependent on the demanded statistical certainty for the measurement, an exceeding of the limiting value is then stated or excluded. The inventive method is advantageous in that the duration of measurement can be significantly shortened in many measurements of objects or persons, when the radiation is far below the limiting value. This has as a consequence that e.g. sluices in nuclear power stations, in which measurements are performed, work considerably faster and that more persons and goods can be guided through them during one shift. It is important to note that the inventive method can make the statement that an exceeding of a limiting value in a radioactivity measurement has occurred or not occurred, respectively, with the same statistical certainty as conventional methods. In the inventive method, the duration of measurement is shortened dependent on the previously performed single measurements, when it can be excluded on the basis of the single measurement(s), with the prescribed statistical certainty, that an exceeding of the limiting value still might occur. The inventive method is designated as $P^2$-method or as "Probability Propagation" by the applicant. The inventive method provides a saving of the duration of measurement, when after first single measurements the statement can be made statistically with sufficient certainty that an exceeding of a limiting value is improbable.

A gaussian distribution is used for the distribution of the measurement values, particularly with measurement devices for $\beta$- and/or $\gamma$-radiation. At comparably low gross counting rates, as occurring e.g. on the measurement of $\alpha$-radiation, the Poisson- or binominal distribution is used for the measurement values.

The inventive method is explained in more detail by means of the single FIG. 1.

DETAILED DESCRIPTION OF THE INVENTION

While this invention may be embodied in many different forms, there are descried in detail herein a specific preferred embodiment of the invention. This description is an exemplification of the principles of the invention and is not intended to limit the invention to the particular embodiment illustrated.

As already set forth, the duration of measurement for a contamination measurement device is calculated in Germany from the detection limit defined in DIN 254821/1. The detection limit is defined as $$\rho_n = (\kappa_\alpha + \kappa_\beta) \cdot \sqrt{\rho_0\left(\frac{1}{t_0} + \frac{1}{t_b}\right)} + (\kappa_\alpha + \kappa_\beta)^2 \cdot \left[\frac{1}{t_0} + \frac{1}{t_b}\right]$$

where $\kappa_\alpha$, $\kappa_\beta$: quantiles of the standard normal distribution
$\rho_0$: expected value of the background counting rate
$\rho_n$: detection limit for the expected value of the net counting rate
$t_o$: duration of measurement of the background measurement
$t_b$: duration of measurement of the gross effect measurement Resolution of the equation for the detection limit yields the gross duration of measurement for the measurement device. In doing this, the detector efficiency is accounted for in known manner. Thus, with given detection limit the duration of measurement is established. The duration of measurement is subdivided into N measurement cycles, each measurement cycle being performed for the duration T.

In the inventive method, after each measurement the probability is calculated which indicates whether on taking into account of the hitherto obtained measurement values, an exceeding of the limiting value will still be obtained in the remaining duration of measurement.

This can be clarified by a simple example: suppose ten single measurements are performed and the limiting value to be checked be twelve. According to the method of the invention, at the end of each single measurement it is calculated how big is the probability that in the remaining single measurements an exceeding of the limiting value will still be obtained.

Thus, after the first single measurement it is asked, for instance, whether the probability is greater than 0.95, that an exceeding of the limiting value will still be obtained in the mean value, when the first measurement value is 2. After the second single measurement, it is asked whether the probability is greater than 0.95, that an exceeding of the limiting value will still be obtained in the mean value, when the first measurement value is 2 and the second measurement value is 3. This procedure is continued, until the estimated probability for the failure of an exceeding of the limiting value is high enough with sufficient certainty on the basis of the developed measurement values.

It will become still more conspicuous that this method provides a saving of time, when the background value is measured. If nine times zero is measured, it is evident without any difficulty that the tenth measurement value will very unlikely be greater than 120, and thus leading to an exceeding of the limiting value. It will demonstrably fall below a demanded probability of 0.95. For this, with known distribution of the measurement values from the first nine measurement values, the parameters of the distribution can be estimated for instance, and then the probability of a measuring value to be greater than 120 can be determined.

The devolution of the procedure is illustrated in the single FIGURE as a flow chart. In the procedure step 10 the magnitude $T_{max}$ is calculated. This magnitude may be, for instance, the before-specified duration of measurement $t_b$. In a subsequent step 12, a measurement with duration T is performed with $T<T_{max}$. The probability $p_i$ is calculated for the measurement value and measurement values measured already previously, that the mean value $\bar{x}$ of all measurements which are possible in the measurement time $T_{max}$, is smaller than a limiting value $x_{Gr}$, the basis of the calculation being the previous measurement values. For the determination of this probability, it is taken advantage that at big counting rates, a normal distribution exists for the measurement values and at low counting rates a Poisson- or binominal distribution exists.

The probability $p_i$ determined in this manner is compared with an appointed statistical certainty of limit exceeding $P_{Gr}$ in procedure step 16. Thus, if the remaining probability $p_i$ for limit exceeding is smaller than the appointed statistical certainty of limit exceeding $P_{Gr}$, a signal $S_i$ is generated in procedure step 18 which stops the total measurement. If this statement is not possible, the total duration of single measurement is subsequently compared with the maximum duration in procedure step 20. If it has been measured for a sufficiently long time already, a signal $S_2$ is generated according to which the probability $p_i$ is greater than $P_{Gr}$ and an exceeding of the limiting value possibly exists. If the hitherto occurred duration of measurement in procedure step 20 is not greater than the total measurement duration, the procedure returns to procedure step 12 and repeats the measurement for the duration of measurement T, which is smaller than $T_{max}$.

It is obviously possible to arrange the duration of measurement of the single measuring procedures in a variable manner, and even to select it in dependence of previous measurement results.

| 1. measurement | 2. measurement | 3. measurement | 4. measurement | 5. measurement | 6. measurement | 7. measurement | 8. measurement | 9. measurement | 10. measurement | Mean value |
|---|---|---|---|---|---|---|---|---|---|---|
| 2 | 3 | 1 | 4 | 2 | 3 | 2 | 3 | 1 | 3 | 2.4 |

The method was tested by simulations, in which an effectiveness increase of about 30% at equal certainty could be achieved on the basis of realistically recorded measurement values. The method was tested with the data of a person monitor of type RTM860TS of the applicant as a pre-monitor of a German nuclear power station. In 36 days, approximately 27 000 measurements were performed in doing this, which corresponds to 13 500 accesses. The average duration of measurement according to DIN was 9.9 seconds per body side. This measurement time could be shortened by 27.9% with the inventive method, which leads to a saving of 34 minutes per day and device at 375 accesses per day on the average.

The above examples and disclosures are intended to be illustrative and not exhaustive. These examples and description will suggest many variations and alternatives to one of ordinary skill in this art. All these alternatives and variations are intended to be included within the scope of the attached claims. Those familiar with the art may recognize other equivalents to the specific embodiments described herein which equivalents are also intended o be encompassed by the claims attached hereto.

What is claimed is:

1. Method for the detection of an exceeding of a predetermined limiting value in a radioactivity measurement, characterized by the following procedure steps:

a total duration of measurement for a contamination measuring device is calculated, several single measurements are performed with the measuring device, with duration of measurement shorter than the total duration of measurement.

after each single measurement, a probability is calculated on the basis of the previously measured measurement values, that with one or several single measurement(s) during a time period the mean value of all the single measurements exceeds the limiting value, the time period having at least the length of the time still remaining to the attainment of the total duration of measurement, in the case that the calculated probability is smaller than a predetermined certainty to exceed the limiting value in the remaining duration of measurement, a signal is generated that an exceeding of the limiting value did not occur and the procedure is ended, otherwise further single measurements are performed until either the total duration of measurement is reached or exceeded or until in one of the single measurements the calculated probability is smaller than or equal to the predetermined certainty, and the procedure is ended.

2. Method according to claim 1, characterized in that a normal distribution is used for the distribution of measurement values.

3. Method according to claim 1, characterized in that the measuring device is constructed for β-radiation and/or γ-radiation.

4. Method according to claim 1, characterized in that with comparatively low counting rates, the Poisson- or binominal distribution is used, preferably when measuring α-radiation.

5. Method according to one of claim 1, characterized in that the total measurement duration is determined depending on the detection limit, the detection limit being defined as $$\rho_n = (\kappa_\alpha + \kappa_\beta) \cdot \sqrt{\rho_0\left(\frac{1}{t_0} + \frac{1}{t_b}\right)} + (\kappa_\alpha + \kappa_\beta)^2 \cdot \left[\frac{1}{t_0} + \frac{1}{t_b}\right]$$

with $\kappa_\alpha$, $\kappa_\beta$ quantiles of the standard normal distribution, $\rho_0$ expected value of the background counting rate, $\rho_n$ detection limit for the expected value of the net counting rate, $t_0$ duration of measurement of the background measurement and $t_b$ duration of measurement of the gross effect measurement.

* * * * *